United States Patent [19]
Yamane et al.

[11] Patent Number: 5,892,805
[45] Date of Patent: Apr. 6, 1999

[54] BOILING WATER REACTOR AND ITS OPERATING METHOD

[75] Inventors: Kouichi Yamane, Hitachi; Yamato Asakura, Hitachinaka; Katsumi Ohsumi, Hitachi; Kenichi Ito, Hitachinaka; Noriyuki Ohnaka, Hitachinaka; Naohito Uetake, Hitachinaka; Motohiro Aizawa, Hitachi; Akira Ichimura, Ibaraki-machi, all of Japan

[73] Assignee: Hitachi, Ltd., Tokyo, Japan

[21] Appl. No.: 683,980

[22] Filed: Jul. 22, 1996

[30] Foreign Application Priority Data

Jul. 26, 1995 [JP] Japan .................................. 7-190036

[51] Int. Cl.⁶ .............................. G21D 1/00; G21D 3/08
[52] U.S. Cl. ............................ 376/306; 376/305
[58] Field of Search ...................... 376/305, 306

[56] References Cited

U.S. PATENT DOCUMENTS 4,940,564  7/1990  Aizawa et al. ........................ 376/306
5,398,269  3/1995  Nagase et al. ........................ 376/306

FOREIGN PATENT DOCUMENTS 5-288893  11/1993  Japan ...................... 376/306
6-8914    2/1994   Japan ...................... 376/306

*Primary Examiner*—Charles Jordan
*Assistant Examiner*—Matthew J. Lattig
*Attorney, Agent, or Firm*—Antonelli, Terry, Stout & Kraus, LLP

[57] ABSTRACT

A reactor water clean-up system is provided with a first filter demineralizer having a filter resin containing an alkali substance and a second filter demineralizer with a filter resin not containing an alkali substance. The reactor water is supplied to the first filter demineralizer during the term from the starting operation of the preoperating test of the nuclear reactor and of each fuel cycle to 2000 EFPH. The alkali substance contained in the filter resin is guided into the nuclear reactor to change the pH of the reactor water in the nuclear reactor to the weak alkali side. The Cr quantity which is taken in the oxide film of the fuel cladding tube surface is reduced. After 2000 EFPH from the starting operation, the supply of the reactor water to the first filter demineralizer is stopped, and then, the reactor water is supplied to the second filter demineralizer.

17 Claims, 11 Drawing Sheets

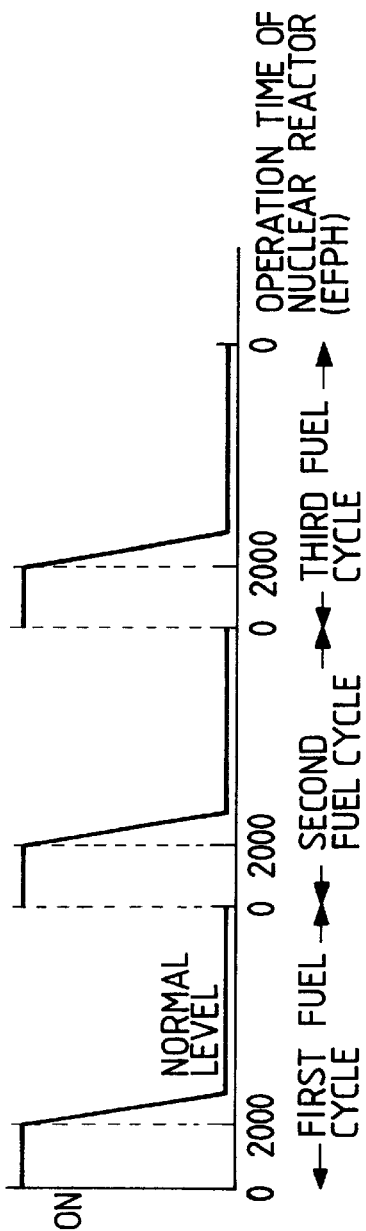
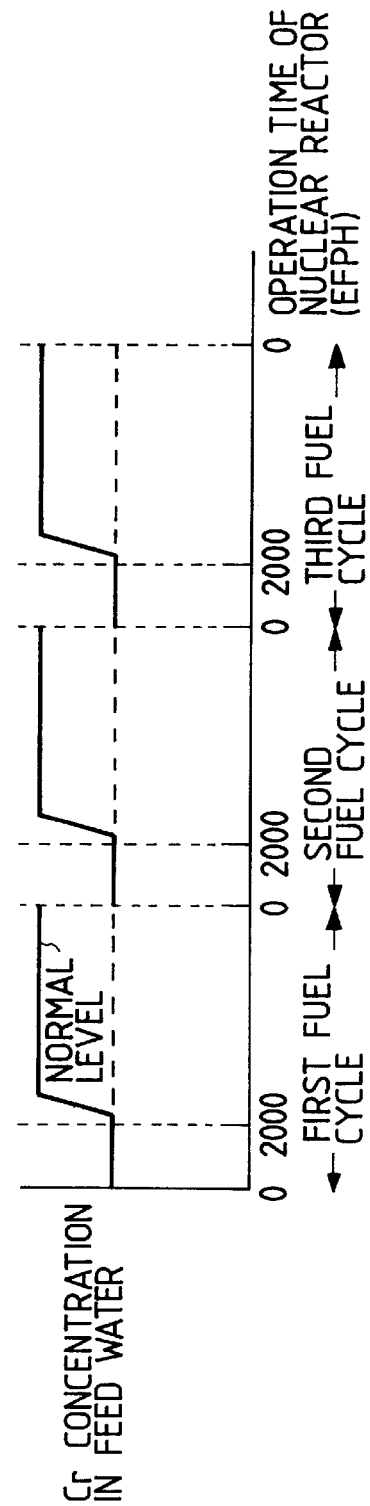
FIG. 8A  $CO_2$ CONCENTRATION IN FEED WATER
FIG. 8B  Cr CONCENTRATION IN FEED WATER

1

BOILING WATER REACTOR AND ITS OPERATING METHOD

BACKGROUND OF THE INVENTION

This invention is related to a method of operation of a nuclear power plant, and particularly to a method suitable for operation of a boiling water reactor power plant.

Generally, corrosion products, such as metallic ion components and insoluble components (clad) and the like, are dissolved little by little into water from structural materials, such as piping, pumps, heat exchangers, etc., of a boiling water reactor power plant (hereinafter referred to as BWR power plant). Most of the corrosion products formed in a turbine system on an upper side of a clean-up system for condensate water are removed by the clean-up system. But, the corrosion products formed in a feed water system at a downstream side of the clean-up system for condensate water are not removed. These corrosion products enter into the nuclear reactor together with the feed water. Most of the corrosion products which enter into the nuclear reactor deposit on the surface of the fuel rods. The corrosion products which are deposited on the surface of the fuel rods are transformed into radioactive nuclides by irradiation with neutrons. For example, Ni and Co contained in the corrosion products are transformed into $^{58}$Co and $^{60}$Co, which have a long half life, respectively, by neutron irradiation. A part of the corrosion products, being a radioactive substance, dissolves from the surface of the fuel rods into the reactor water, or exfoliates from the surfaces of the fuel rods. The dissolved or the exfoliated corrosion products deposit on the inner surfaces of equipment and pipings of a primary loop recirculation system or the clean-up system for the reactor water. Therefore, the dosage rate of the equipment and the pipings of the primary loop recirculation system, or of the reactor water cleanup system, increases. In the case where $NiFe_2O_4$ and $CoFe_2O_4$ are composite oxides of the corrosion products of Ni and Co that deposit on the surfaces of the fuel rods, the speed of re-dissolution of the composite oxides into the reactor water, or the speed of their exfoliation from the surfaces of the fuel rods, becomes very slow. The composite oxides stay on the surfaces of the fuel rods for a long time after they have deposited. As a result, re-deposition of the corrosion products, which are radioactive substances, on the equipment and pipings is suppressed. Ni and Co in the reactor water form stable composite oxides by setting a weight ratio of Fe/Ni in the feed water to 2 or more (actually, about 3). In order to obtain the Fe/Ni weight ratio, a technique for controlling the iron concentration in the feed water has already been adopted in the BWR. However, even when the Fe concentration is controlled, as mentioned above, a new phenomenon was observed wherein the concentration of the radioactive substances, such as $^{60}$Co, in the reactor water changes. The reason is that the concentration of the radioactive substances in the reactor water does not stabilize due to an increase of the quantity of Cr dissolving from stainless steel pipes used for heat transfer pipes of the feed water heater. The increase in the dissolution quantity of Cr accelerates re-dissolution of clad deposited on the fuel rods. Several measures are described in Japanese patent Laid-open Print No. 5-288893. These measures suppress a fluctuation in the concentration of radioactive substances in the reactor water, to control the Cr quantity in the deposit on the fuel rods in addition to controlling the Fe quantity. The Laid-open Print describes a method for reducing the Cr content in clad deposited on the fuel rods by methods such as a method for properly managing the concentration of an oxidizing agent in the feed water, a method for substituting a material having a high Cr content for a low Cr content material, a method for making alkali ions coexistent with Cr ions in the reactor water, and a method for efficiently operating the clean-up equipment for cleaning the reactor water. Japanese Patent Publication No. 68914 describes a technique that controls the pH of the reactor water to a weak alkali state. This is the technique that suppresses an uptake of radiation to the main pipe and is applied only at the time of the starting operation of the nuclear reactor when the uptake speed is fast. But, Japanese Patent Laid-open Print No. 5-288893 does not pay attention to the injection time of an alkali metal. The technique disclosed in Japanese Patent Publication No. 6-8914 is applied only to controlling the weak alkali state at the time of starting, but this technique cannot suppress Cr loading on the fuel rods in new fuel assemblies to be loaded during every operating cycle.

SUMMARY OF THE INVENTION

An object of this invention is to provide a method of operating a BWR power plant that can reduce Cr loading on fuel rod surfaces over all operating cycles.

A first feature of this invention for achieving the above object is to inject an alkali metal or alkaline earth metal into the reactor water during the term from a starting operation of a preoperating test or of each fuel of the cycle of the nuclear reactor to the 2000 EFPH, and to stop the injection of the alkali metal or the alkaline earth metal during the period between the 2000 EFPH and the stopping of the BWR power plant. EFPH stands for an effective full power hour, which represents a percentage of an integral value of the actual thermal output per a rated thermal output within a time period of the actual thermal output. Cr deposited on the surfaces of the fuel rods dissolves into the reactor water thereby to locally acidify the reactor water on the surfaces of the fuel rods. This accelerates the dissolution of the deposit into the reactor water. As will be described later, the deposit of Cr on the surfaces of the fuel rods occurs by taking Cr into an oxide film during the term of forming the oxide film on the fuel rod surfaces. The above term is from the starting operation of the preoperating test or of each fuel cycle of the nuclear reactor to the 2000 EFPH. By the injection of the alkali metal or the alkaline earth metal into the reactor water during the above term, Cr easily exists in the reactor water as Cr oxide ions. Therefore, the amount of Cr that deposits on the surfaces of the fuel rods as a Cr oxide decreases. This phenomenon lowers the local acidification of the reactor water, which is caused by dissolution of Cr deposited on the fuel rod surfaces so that the dissolution of the radioactive substances into the reactor water is suppressed. The concentration of the radioactive substances contained in the reactor water decreases, resulting in a decrease in the surface dose rate of the pipes and the devices for the primary loop recirculation system, the clean-up system of reactor water and so on.

A second feature of this invention is to provide a method for operating a BWR power plant comprising pipings of a clean-up system, both ends of which are connected to a nuclear reactor, wherein the clean-up system for the reactor water comprises the pipings of the clean-up system, a first clean-up unit having ion exchange resin to which an alkali metal or alkaline earth metal is added, the first clean-up unit being installed in the pipings of the clean-up system, and a second clean-up unit having an ion exchange resin to which no alkali metal or the alkaline earth metal is added and which is connected in parallel with the first clean-up unit, the improvement of which comprises the following steps: supplying the reactor water in the nuclear reactor to the piping of the clean-up system, returning the reactor water to the nuclear reactor after the reactor water is purified by the first clean-up unit during the term from the starting test of said nuclear reactor or the starting operation of each fuel cycle to the 2000 EFPH, and returning the reactor water to said reactor after purifying it using the second clean-up unit during the period between the 2000 EFPH and the stopping of the nuclear reactor. By the second feature, the same effect as in the first feature is achieved. According to the second feature, the alkali metal or the alkaline earth metal can be easily shifted from the ion exchange resin in the first clean-up unit to the reactor water during the above term, thereby cleaning the reactor water with the first clean-up unit.

A third feature of this invention is to inject a material, which changes the pH of the feed water to the acid side, into the feed water from the feed water system or the condensate system during the period between the starting operation and the 2000 EFPH and to stop the injection of the material after the above period lapses. By injecting the material for changing the pH of the feed water to the acid side into the feed water from the feed water system or the condensate system during the above term, nonradioactive Cr which exists in the interior of the structure of the feed water system or the condensate system becomes a stable Cr oxide. Therefore, the dissolution of the Cr into the cooling water of the primary system is suppressed, and the Cr quantity included in the reactor water is decreased more than in the case of the first feature.

A fourth feature of this invention is to inject hydrogen of a molar concentration which is 2~3 times the molar concentration of dissolved oxygen into the feed water during the above term. The injection of the hydrogen at the above concentration reduces the corrosion potential of the feed water in the above term. Therefore, the Cr on the interior of the structure of the feed water system or of the condensate system becomes a stable Cr oxide, and the dissolution of Cr into the feed water is suppressed.

A fifth feature of this invention is to use cladding tubes which have no oxide film on the surfaces thereof for fuel rods of fuel assemblies of 0(zero) GW·day/t burn-up loaded in the nuclear reactor. Because of the amount of Cr which is taken into an oxide film from the reactor water in forming the oxide film on the surfaces of the cladding tubes in the nuclear reactor, there is little dissolution of the Cr on the surfaces of the cladding tubes. Therefore, even when the fuel assemblies of 0(zero) GW·day/t burn-up comprising fuel rods containing cladding tubes not formed with an oxide film on the surfaces are loaded in the nuclear reactor, the concentration of the radioactive substances contained in the reactor water is small.

A sixth feature of this invention is to control the quantity of oxygen which is injected into feed water from a condensate system or a feed water system so as to obtain a dissolved oxygen concentration of 10 ppb to 30 ppb in the feed water during the above term, whereby corrosion of the condensate system or of the feed water system in the term is remarkably decreased. Consequently, the quantity of the Cr brought into the nuclear reactor together with the feed water remarkably decreases. The quantity of the Cr taken into the surfaces of fuel rods decreases, and the concentration of the radioactive substances contained in the reactor water decreases.

A seventh feature of this invention is to increase the quantity of reactor water supplied to a clean-up system for the reactor water for purifying the reactor water during the above term. In the term, the amount of reactor water to be supplied to the reactor clean-up system is increased so that the quantity of the radioactive substances in the reactor water can be decreased.

An eighth feature of this invention is to use a material of low Cr dissolution for at least one part of the primary system pipings, which are connected to the nuclear reactor, in which cooling water flows, so that the dissolution quantity of the Cr from the low Cr dissolution material absolutely decreases. Therefore, the cr quantity itself which is taken into the nuclear reactor is reduced, and the Cr quantity deposited on the fuel rods is reduced.

BRIEF DESCRIPTION OF THE DRAWINGS

FIG. 8A is an operational diagram which shows a relation between a concentration of carbon dioxide gas in feed water and an operating time in each fuel cycle of the other examples of this invention.

FIGS. 8B and 8C are operational diagrams which show relationships between a Cr concentration in feed water and an operating time in each fuel cycle of the other examples of this invention.

DETAILED DESCRIPTION OF THE PREFERRED EMBODIMENTS

Figure 1:
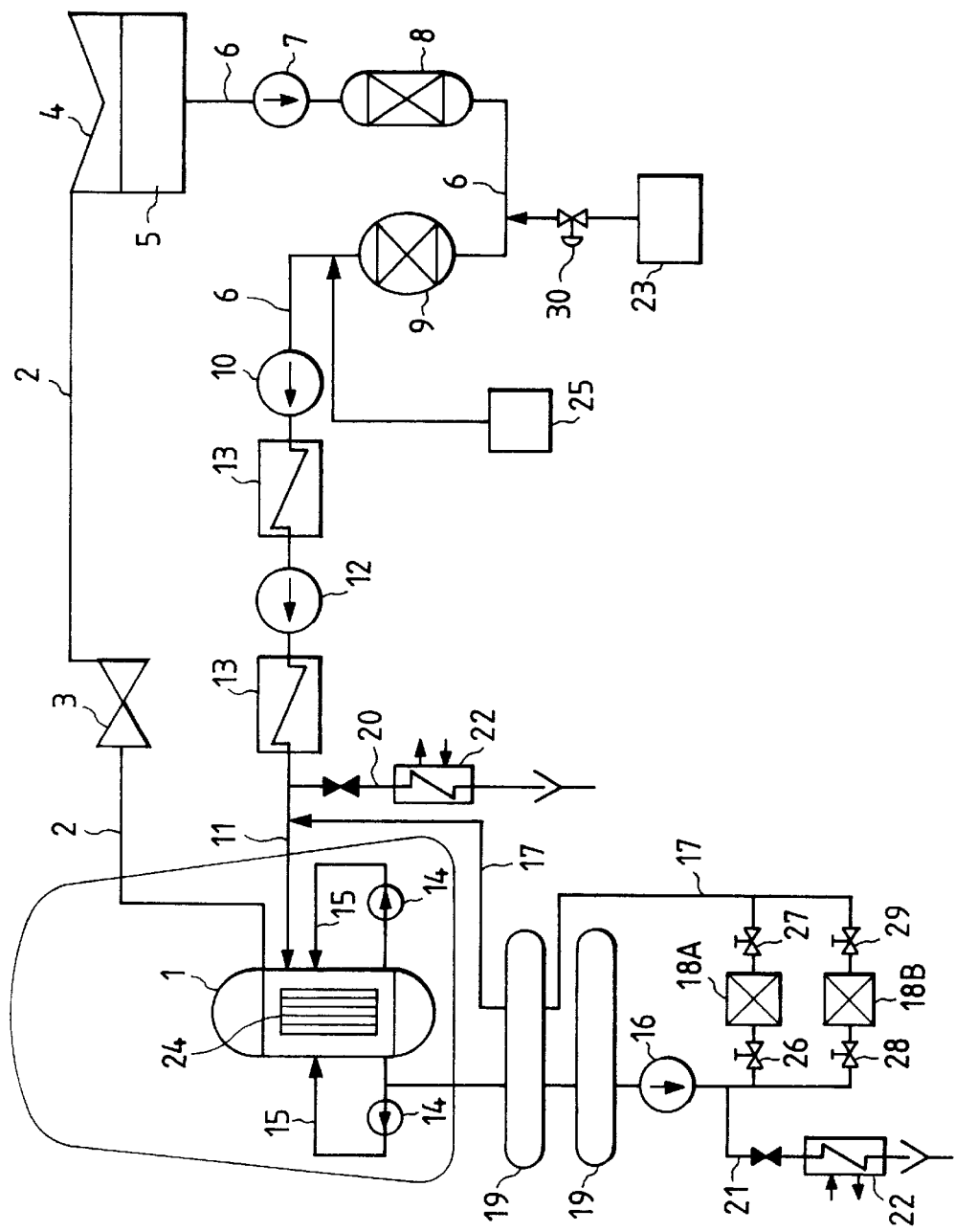
FIG. 1 is a schematic diagram of a suitable example of BWR according to this invention.

An example of a BWR according to this invention will be explained with reference to FIG. 1. The BWR power plant of this example is provided with nuclear reactor 1, high pressure turbine 3, low pressure turbine 4, a condenser 5, a condensate system and a feed water system. Nuclear reactor 1 generates heat by fission of nuclear fuel to produce steam. The steam generated in the nuclear reactor 1 is guided to the high pressure turbine 3 and to the low pressure turbine 4 via main steam piping 2. Condenser 5 condenses the steam which is discharged from the low pressure turbine 4. The water discharged from the condenser 5 is returned to the nuclear reactor 1 by the condensate system and the feed water system. The condensate system is composed of a condensate water pump 7, a condensate filter 8, a condensate demineralization unit 9 and a condensate water pump 10 that are connected to each other by condensate system piping 6. Condensate water pump 7 raises the pressure of the condensate water discharged from the condenser 5. Condensate filter 8 and condensate demineralizer 9 carry out filtration and demineralization of the condensate water. Condensate water pump 10, which further increases the pressure of the condensate water, is disposed at the downstream side of the condensate demineralizer unit 9. The feed water system is connected to the condensate system piping 6 and to the nuclear reactor 1 by way of piping 11. The feed water system is provided with feed water heaters 13 and a feed water pump 12 that are connected with the feed water system piping 11. Feed water heaters 13 elevate the temperature of the condensate water to make feed water. Feed water pump 12 increases the pressure of the feed water. Feed water piping 11 guides the feed water to the nuclear reactor.

On the other hand, the reactor water in the nuclear reactor 1 circulates through two primary loop recirculation systems, each comprising a recirculation pump 14 and recirculation system piping 15. A part of the reactor water flowing through the recirculation system piping 15 is guided to the reactor water clean-up system. The reactor water clean-up system comprises a heat exchanger 19, a clean-up system pump 16 and filter demineralizers 18A and 18B that are connected to clean-up system piping 17. Filter demineralizer 18A and filter demineralizer 18B are arranged in parallel with each other. Clean-up system piping 17 is connected to both the recirculation system piping 15 and the feed water piping 11. Filter demineralizers 18A and 18B remove radioactive substances contained in the reactor water. Heat exchanger 19 cools the reactor water that is supplied to filter demineralizers 18A and 18B. The reason for cooling the reactor water is that the temperature of the reactor water must be controlled to 60° C. or less, because filter demineralizer 18A uses an ion exchange resin powder. The impurity which flows into nuclear reactor 1 together with the feed water is concentrated by boiling it in the nuclear reactor 1. A part of this impurity is eliminated by filter demineralizers 18A and 18B, so that the reactor water is kept clean. Filter demineralizer 18A uses a filter resin to which an alkali substance (for example, Na) is added. Filter demineralizer 18B uses a filter resin to which no alkali substance is added. Valves 26 and 27 are provided in front of and after the filter demineralizer 18A, respectively. Valves 28 and 29 are provided in front of and after filter demineralizer 18B, respectively. Water quality monitoring of the reactor water and the feed water in the nuclear reactor 1 is accomplished by analyzing a sample of the water taken from the parts corresponding thereto. Sampling pipings 20 and 21 are connected to both the feed water piping 11 and the piping 17 of the clean-up system. A cooler 22 is installed in each of the sampling pipings. An iron injection system 25 injects iron ions into the condensate water in the condensate system piping 6. The injection quantity of iron ions is controlled so as to be about 3 in a ratio of Fe/Ni ions. Therefore, the clad deposited on the surface of cladding tube 24 of the fuel rods is stabilized. In addition, feed water piping 11 uses carbon steel for parts between the two feed water heaters 13. To prevent corrosion of this piping, an oxygen injection system 23 continuously injects oxygen gas into the condensate water in the condensate system piping 6. The quantity of oxygen being injected is controlled so that the dissolved oxygen concentration of the feed water system is 20 to 200 ppb. An example of the oxygen injection quantity is determined in accordance with the plants involved. However, the injection of oxygen to prevent corrosion of the carbon steel promotes the dissolution of Cr of the stainless steel (SUS material) used for the feed water heater 13. Dissolved Cr is guided into the nuclear reactor 1. Cr ions contained in the reactor water turn into such anionic impurities as $CrO_4^{2-}$ under the reactor water chemistry environment. An increase of a concentration of $CrO_4^{2-}$ ions frees hydrogen ions in the reactor water, and the hydrogen ions acidify the reactor water. The above phenomenon has occurred, particularly on the outer surface of the cladding tubes 24 where an impurity dissolved in the reactor water is condensed by boiling the reactor water. That is, the acidity of the reactor water is locally strengthened. The acidification of this reactor water accelerates the dissolution of the deposit on the outer surface of the cladding tubes 24. By acidification of the reactor water, the dissolution of the radioactive substances contained in the deposit also increases. The fuel rods use a cladding tube 24 whose surfaces are formed with no oxide film. During operation of a nuclear reactor loaded with these fuel rods, Cr contained in the reactor water is taken in an oxide film in the process of forming the oxide film on the outer surface of cladding tube 24, and so there is a possibility of the pH being lowered in local areas of the outer surface of cladding tube 24. Consequently, in order to repress the quantity of the radioactive nuclides which are dissolved from the surface cladding tube 24, it is necessary to repress the quantity of Cr, which is taken in the oxide film from the reactor water to as low a level as possible in the term during which the oxide film is formed on the surface of the cladding tube 24. This method will be explained below.

Figure 2:
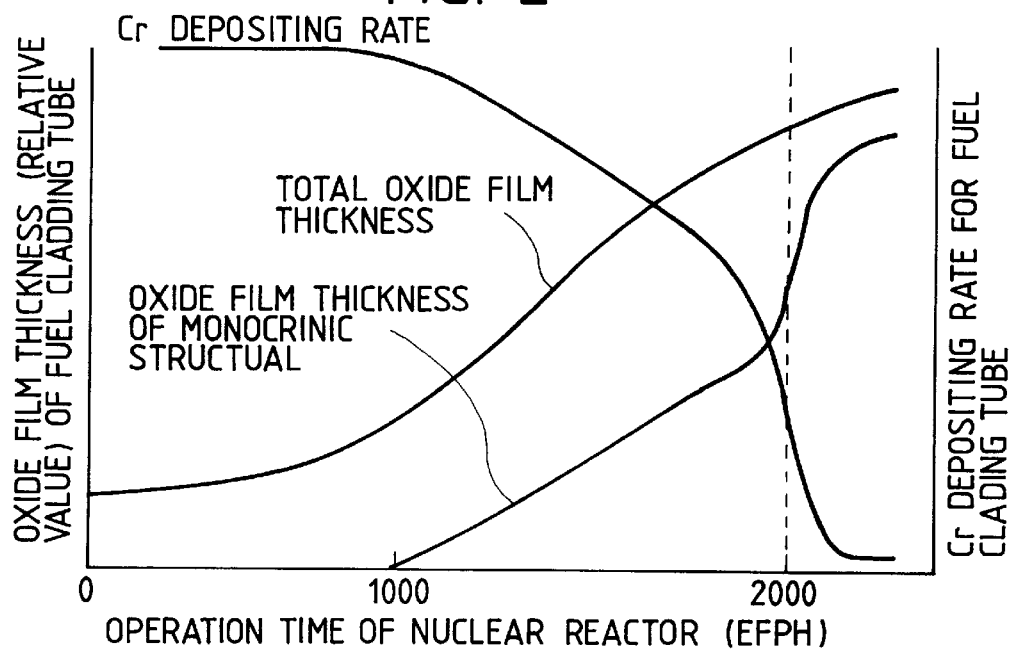
FIG. 2 is a characteristic diagram which shows a relationship between an oxide film thickness on fuel cladding tubes and a deposit speed of Cr on the fuel cladding tubes with respect to an operating time of a nuclear reactor.

FIG. 2 shows the relationship between the operating time of the nuclear reactor, and the oxide film thickness of the cladding tube with respect to the deposition speed of Cr on the cladding tube. From FIG. 2, it is apparent that the oxide film thickness becomes almost saturated with the expiration of 2000 EFPH from the starting operation of the nuclear reactor. It is generally said that the higher the rate of monoclinic crystal structure in the oxide film is, the better the corrosion resistance of Zr is. According to a result of analysis by the inventors, it was proved that the time needed for achieving the rate of monoclinic crystal structure of 90% in the whole oxide film from the starting operation of the nuclear reactor is 2000 EFPH. It was also proved that the growth speed of the oxide film decreases as the monoclinic crystal grows. Therefore, it is effective to prevent deposition of Cr ions on the surface of the cladding tube in the term during which the oxide film is formed on the surface of the fuel cladding tube, especially in the term wherein the growth speed of the oxide film is fast.

Figure 3:
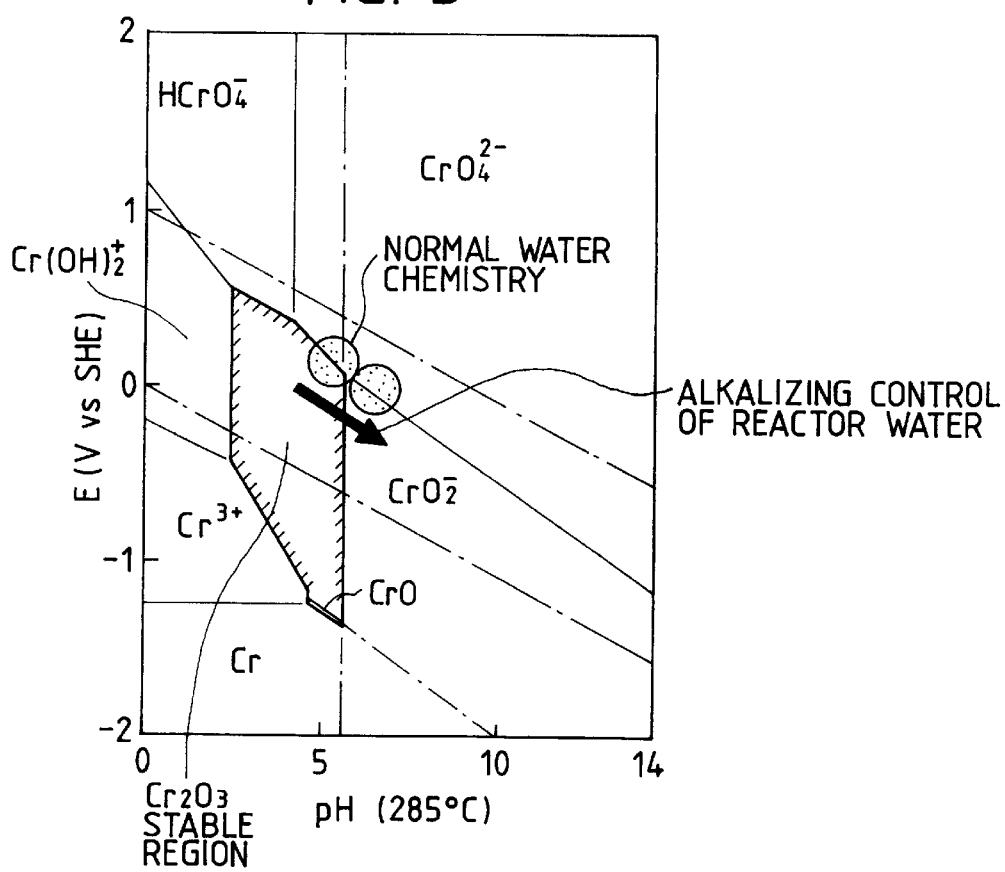
FIGS. 3 and 6 are diagrams which show relations between a corrosion potential of Cr and pH.

FIG. 3 shows the relation between corrosion potential and the pH of the Cr ions. The corrosion potential in FIG. 3 shows relative values of the corrosion potential (SHE) that is measured by a standard hydrogen electrode as a reference electrode. The pH in FIG. 3 denotes the value at a reactor water temperature of 285° C. FIG. 3 shows that while a part of the Cr ions exists as Cr oxide ions in the water chemistry environment of an ordinary primary system of the cooling water, some of them precipitate in the reactor water as Cr oxide. FIG. 3 also shows that if the water chemistry environment is shifted to the alkali side, that is if the pH of the primary system cooling water is increased, most of the Cr exists in the cooling water as Cr oxide ions. The inventors paid attention to this phenomenon and concerned that it was possible to reduce the Cr quantity being deposited on the surface of the fuel cladding tube by controlling the reactor water to produce a weak alkali environment. An actual pH control of the reactor water was carried out by using a filter demineralizer filled in advance with a filter resin to which an alkali substance (for example, Na) was added. This alkali substance was supplied to the nuclear reactor with a distributed equilibrium with the hydrogen ions in the reactor water. In this case, after 2000 EFPH from the starting operation of the preoperating test and in each fuel cycle of the nuclear reactor, the amount of Cr taken in the oxide film of the fuel cladding tube surfaces was effectively reduced by exchanging the filter resin containing the alkali substance in the filter demineralizer with another filter resin not containing the alkali substance. Therefore, local acidification of the reactor water was suppressed. The acidification of the reactor water takes place due to the dissolution of the Cr deposited on the fuel cladding tube surface. In the following, the term from the starting operation of the preoperating test or from each fuel cycle to 2000 EFPH is defined as a 2000 EFPH period. Suppression of the acidification of the reactor water mentioned above suppresses the dissolution of the radioactive substances to reduce the concentration of radioactive substances in the reactor water. One of the actual methods for exchanging the filter resin containing the alkali substance with a filter resin not containing the alkali substance is to change the operation of valves 26 and 27 with that valves 28 and 29 in FIG. 1. During the 2000 EFPH period, valves 26 and 27 are opened, and valves 28 and 29 are closed. The reactor water is guided to filter demineralizer 18A through clean-up system piping 17. Na ions shifted into the reactor water from the filter resin due to the distribution equilibrium with the hydrogen ions are guided into the nuclear reactor 1. Therefore, the pH of the reactor water in the nuclear reactor 1 shifts to the alkali side. When the 2000 EFPH period has ended, valves 26 and 27 are closed, and valves 28 and 29 are opened. Then, reactor water is supplied to filter demineralizer 18B, and the supply of the reactor water to the filter demineralizer 18A is stopped.

The alkali substance is supplied to the nuclear reactor during the whole of the 2000 EFPH period. However, the supply of the alkali substance during the whole of the 2000 EFPH period is not always necessary. The same effect as mentioned above can be sufficiently achieved by supplying the alkali substance to the nuclear reactor during at least the term from the starting operation to 1000 EFPH, because, as is shown in FIG. 2, the deposition speed of Cr on the fuel cladding tube surface becomes large in the term from the starting operation to 1000 EFPH. The supply of the alkali substance to the nuclear reactor in the 2000 EFPH period further brings about the following effects. That is, the oxide film does not overly grow under the condition that the thickness of the oxide film on the fuel cladding tube surface is saturated. There is a method for injecting the alkali substance, such as the alkali metal or the alkaline earth metal, directly into the clean-up system of the reactor water, or a driving hydraulic system for the control rods, whereby the pH of the reactor water can be controlled. By these methods, the pH of the reactor water is controlled to about 6 at the reactor water temperature of 285° C.; that is, the pH is controlled to about 7.5~8.5. A method of controlling the pH of the reactor water described in Japanese Patent Publication No. 6-8914 also can be utilized.

Figure 4A:
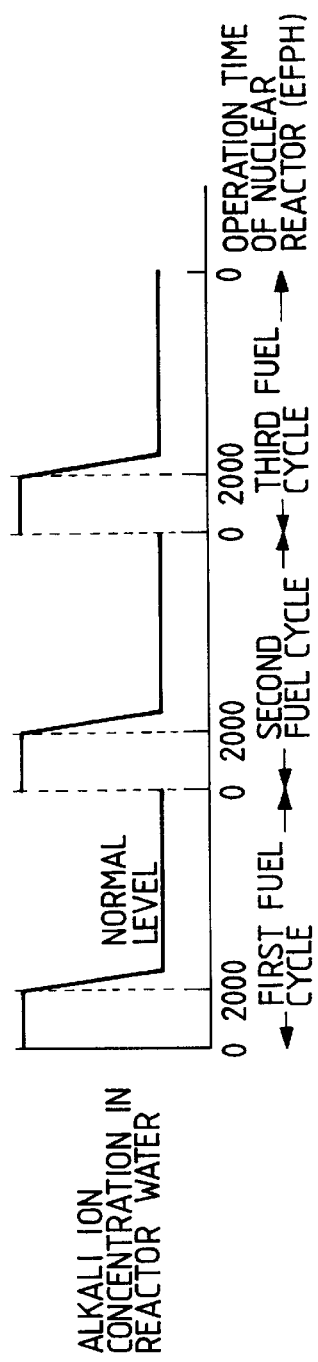
FIG. 4A is an operational diagram which shows a relation between an alkali ion density in reactor water and an operating time in each fuel cycle of the example shown in FIG. 1.

The results of pH control of the reactor water in the plant will be explained with reference to FIGS. 4A to 4E, wherein a method for operating a BWR power plant having the structure shown in FIG. 1 was employed. The pH control of the reactor water is employed in the first example. In this example, valves 26 and 27 are opened, and valves 28 and 29 are closed during the 2000 EFPH period. Na ions shifted into the reactor water from the filter resin of the filter demineralizer 18A are guided into the nuclear reactor 1. The 2000 EFPH period is the term of pH control. A desired value of the pH of the reactor water during the 2000 EFPH period is within a range between 7.5 and 8.5 at a room temperature of 25° C. After the 2000 EFPH period, the valves 26 and 27 are closed, and the valves 28 and 29 are opened to stop the pH control of the reactor water. The alkali ion concentration in the reactor water in each operation cycle is controlled in the first example as shown in FIG. 4A.

Figure 4B:
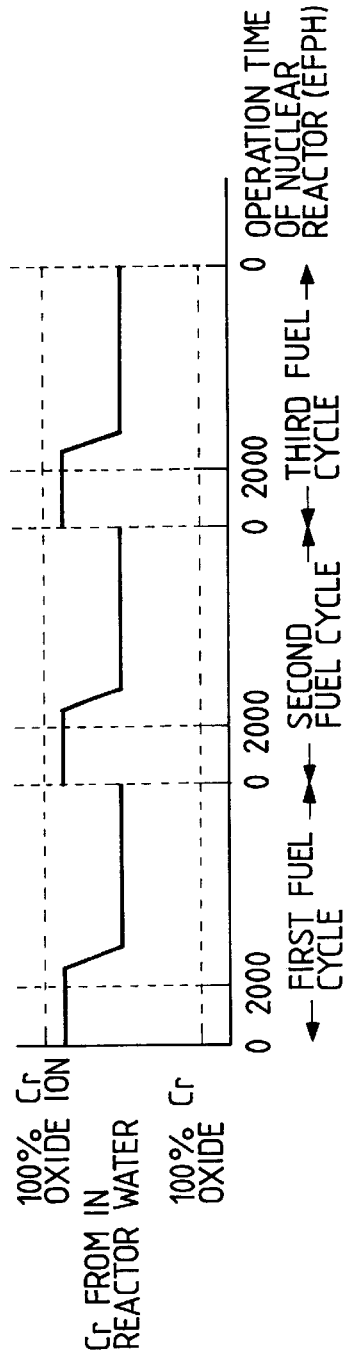
FIG. 4B is an operational diagram which shows a relation between a state transformation of Cr in reactor water and an operating time in each fuel cycle of the example shown in FIG. 1.
Figure 4C:
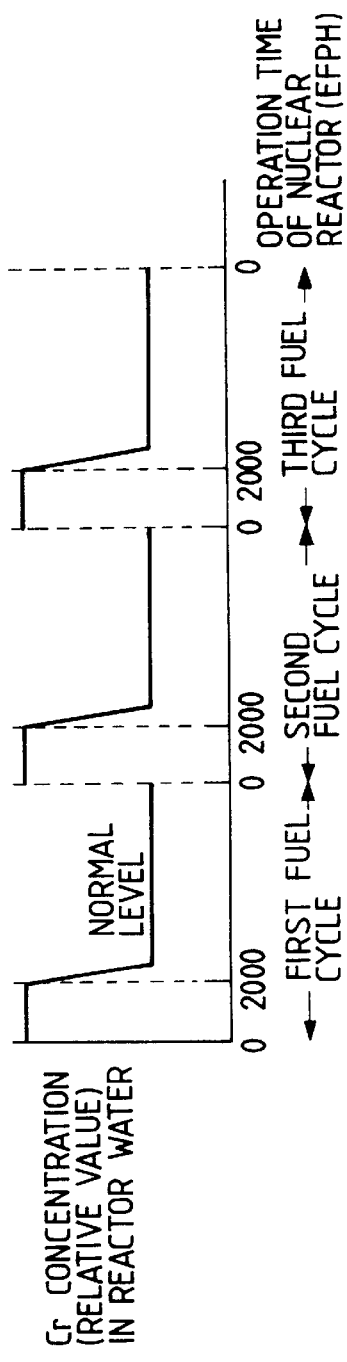
FIG. 4C is an operational diagram which shows a relation between Cr concentration in reactor water and an operating time in each fuel cycle of the example shown in FIG. 1.
Figure 4D:
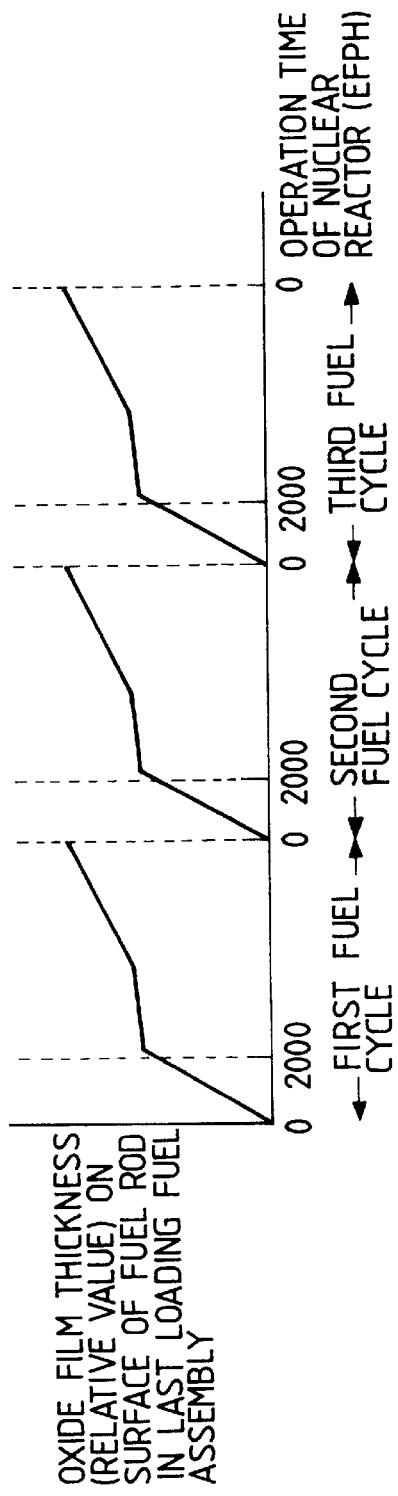
FIG. 4D is an operational diagram which shows a relation between an oxide film thickness of a fuel rod surface that is newly loaded in a core and an operating time in each fuel cycle of the example shown in FIG. 1.
Figure 4E:
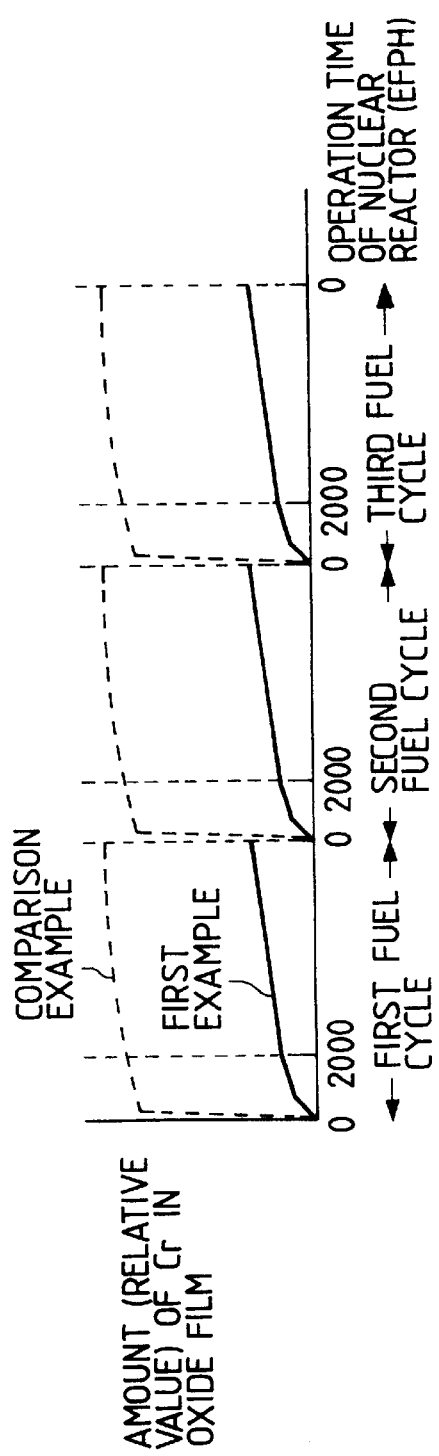
FIG. 4E is an operational diagram which shows a relation between a Cr content of an oxide film of a fuel rod that is newly loaded in a core and an operating time in each fuel cycle of the example shown in FIG. 1.

FIG. 4B shows an instability of Cr in the reactor water in each operating cycle. As is mentioned above, the existing form of Cr is changed from $Cr_2O_3$ (Cr oxide) to $CrO^{2-}$ (chromic acid ions) by the shifting pH of the reactor water to the alkali side. The chromic acid ions are easy to dissolve into the reactor water, which is a solution. As a result, as shown in FIG. 4C, the Cr concentration in the reactor water increases during the 2000 EFPH period. A change in the oxide film thickness of the fuel rod surfaces in the new fuel assemblies loaded into each operating cycle is shown in FIG. 4D. As mentioned above, the growth of the oxide film is very fast during the 2000 EFPH period. The Cr quantity taken in the oxide film is reduced over all of the operating cycles, as shown in FIG. 4E, by the instabilization of the Cr in the reactor water carried out during this term, as shown in FIG. 4B. FIG. 4E shows the Cr quantity in the oxide film in both the first example and a comparative example. In the comparative example, the alkali ion concentration is maintained at an ordinary level, as shown in FIG. 4A during the 2000 EFPH period. In this example, the local acidification of the reactor water is lowered by dissolution of Cr deposited on the fuel rod surfaces, thereby to suppress the dissolution of the radioactive substances, as apparent from FIG. 4E. Consequently, the concentration of the radioactive substances in the reactor water is lowered. Furthermore, the surface dose rates of the pipings and devices are reduced so that the dose of radiation to which workers are exposed at the time of periodic inspection of the plant is reduced. Even when oxygen is injected in place of alkali ions from the reactor water clean-up system or the control rod driving hydraulic system, the same effect as mentioned above can be achieved. That is, the oxygen injection into the reactor water during the 2000 EFPH period shifts the corrosion potential shown along the vertical axis of FIG. 3 to the + (plus) side. Therefore, $Cr_2O_3$ changes into $CrO_4^{2-}$, which is easily dissolved in the reactor water, being a solution. As a result, the Cr quantity taken in the oxide film is lowered, so that the concentration of radioactivity in the reactor water declines.

Figure 5A:
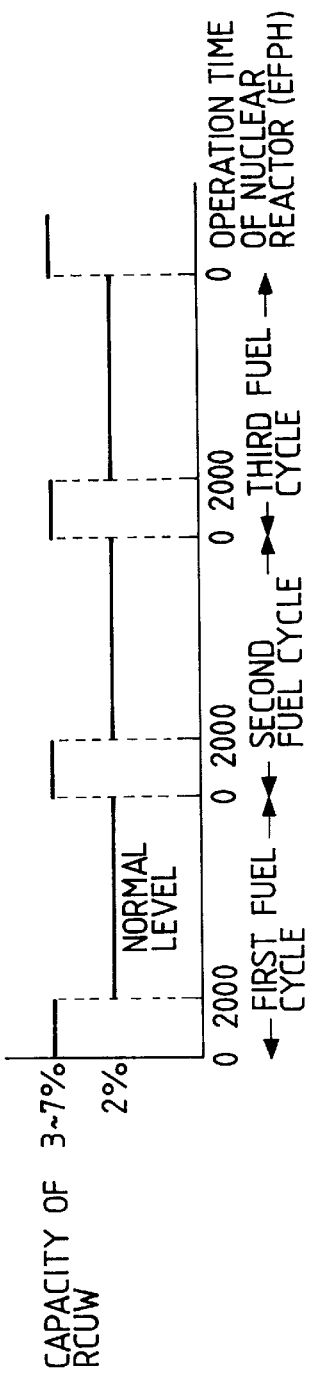
FIG. 5A is an operational diagram which shows a relationship between a reactor clean-up system of reactor water and an operating time in each fuel cycle of another example of this invention.
Figure 5B:
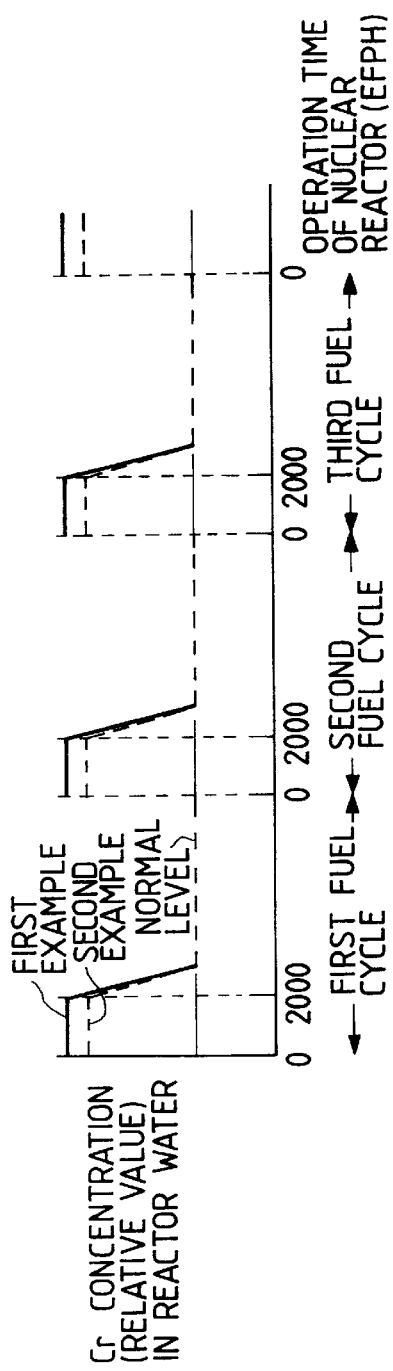
FIG. 5B is an operational diagram which shows a relationship between a Cr concentration in reactor water and an operating time in each fuel cycle of the another example of this invention.
Figure 5C:
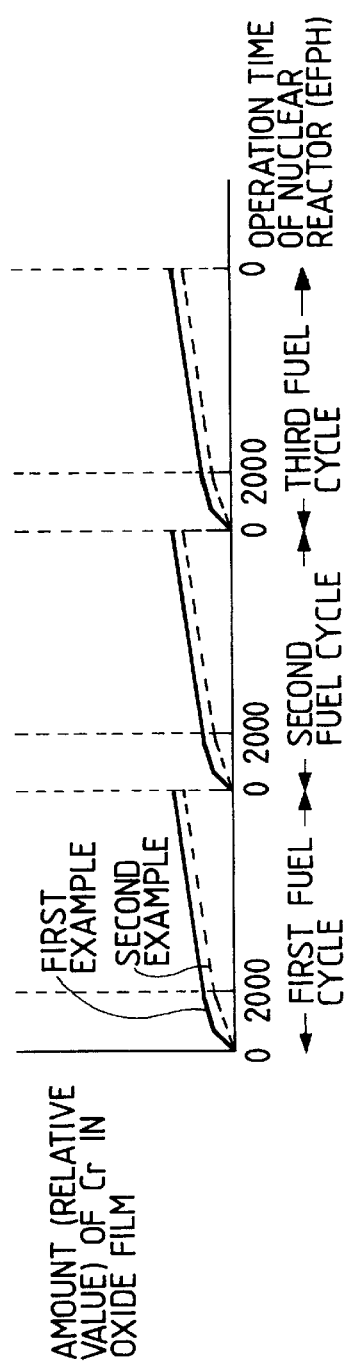
FIG. 5C is an operational diagram which shows a relation between a Cr content of an oxide film of a fuel rod that is newly loaded in a core and an operating time in each fuel cycle of the another example of this invention.

Next, a second example of a method of operating a BWR power plant is described below. In the second example, pH control of the reactor water was employed. The operation method of the second example is the same as in the first example. As is shown in FIG. 5A, the speed of the reactor water clean-up system pump 16 is increased in the second example, so that the flow rate of reactor water in the reactor water clean-up system is increased in the 2000 EFPH period. The flow rate of the reactor water in the reactor water clean-up system is 2% of the reactor water supplied to the core other than in the 2000 EFPH period. In the 2000 EFPH period, the flow rate of the reactor water in the reactor water clean-up system is 3% to 7% of the reactor water supplied to the core. The increase in the flow rate of reactor water in the reactor water clean-up system reduces the Cr quantity included in the reactor water in comparison to that of the first example, as is shown in FIG. 5B. In the second example, the Cr quantity taken into the oxide film of the fuel rod surfaces is smaller than that in the first example, as shown in FIG. 5C. Therefore, the concentration of radioactive substances in the reactor water becomes smaller than that in the first example. The method of operation of the reactor water clean-up system of this example can be the method described in Japanese Patent Publication No. 4-23237.

Figure 6:
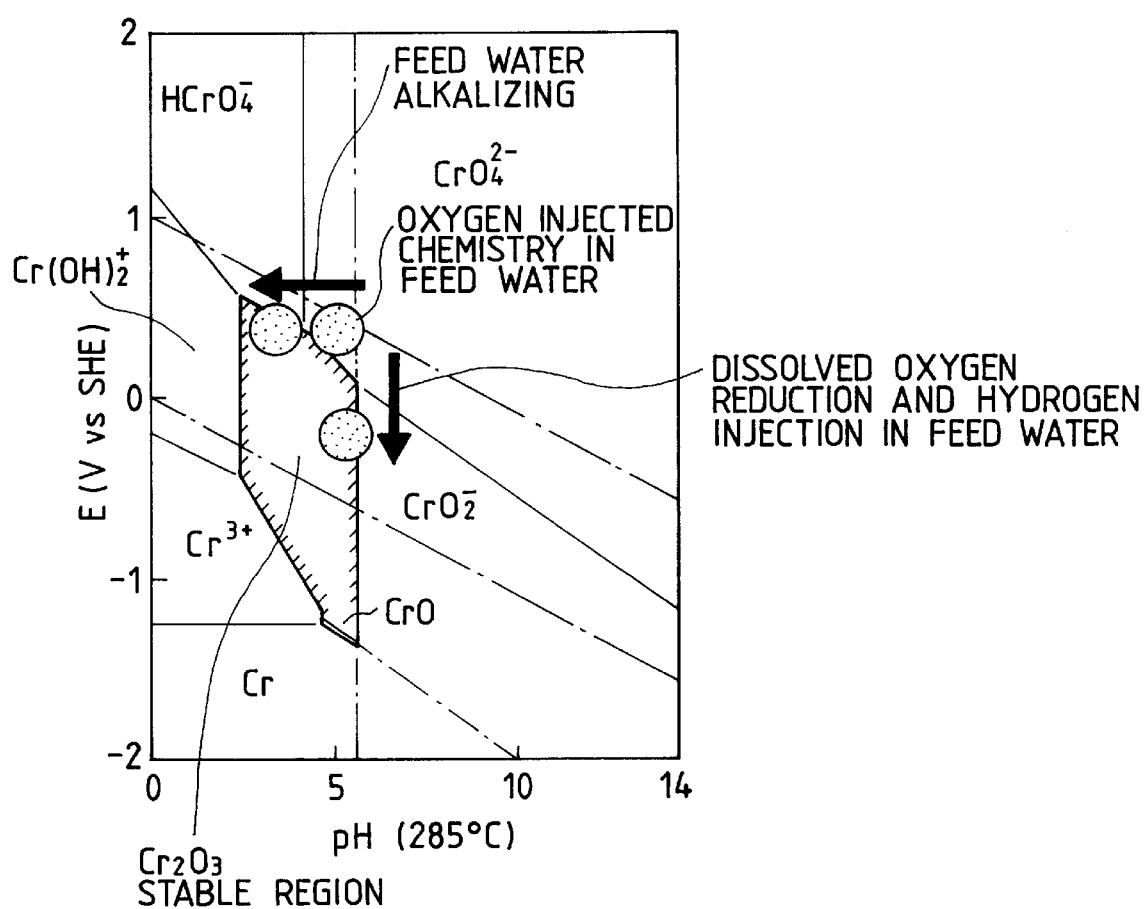

A third example, as applied to an operating method of a BWR power plant, will be described. As is shown in FIG. 3, part of the Cr exists as Cr oxide ions under the water chemistry environment of the ordinary primary system cooling water. Some of the Cr oxide ions precipitate as Cr oxide. However, as is shown in FIG. 6, the oxygen injection mentioned above increases the corrosion potential. This increase in the corrosion potential accelerates dissolution of Cr as Cr oxide ions from the structural materials in the feed water system. The inventors have discovered that Cr can be stabilized again by shifting the pH value to the weak base side even when the corrosion potential is high, based on the corrosion potential—pH chart of FIG. 6. As a result, the inventors have devised a method of suppression of the dissolution of Cr in the condensate system and the feed water system.

Figure 7:
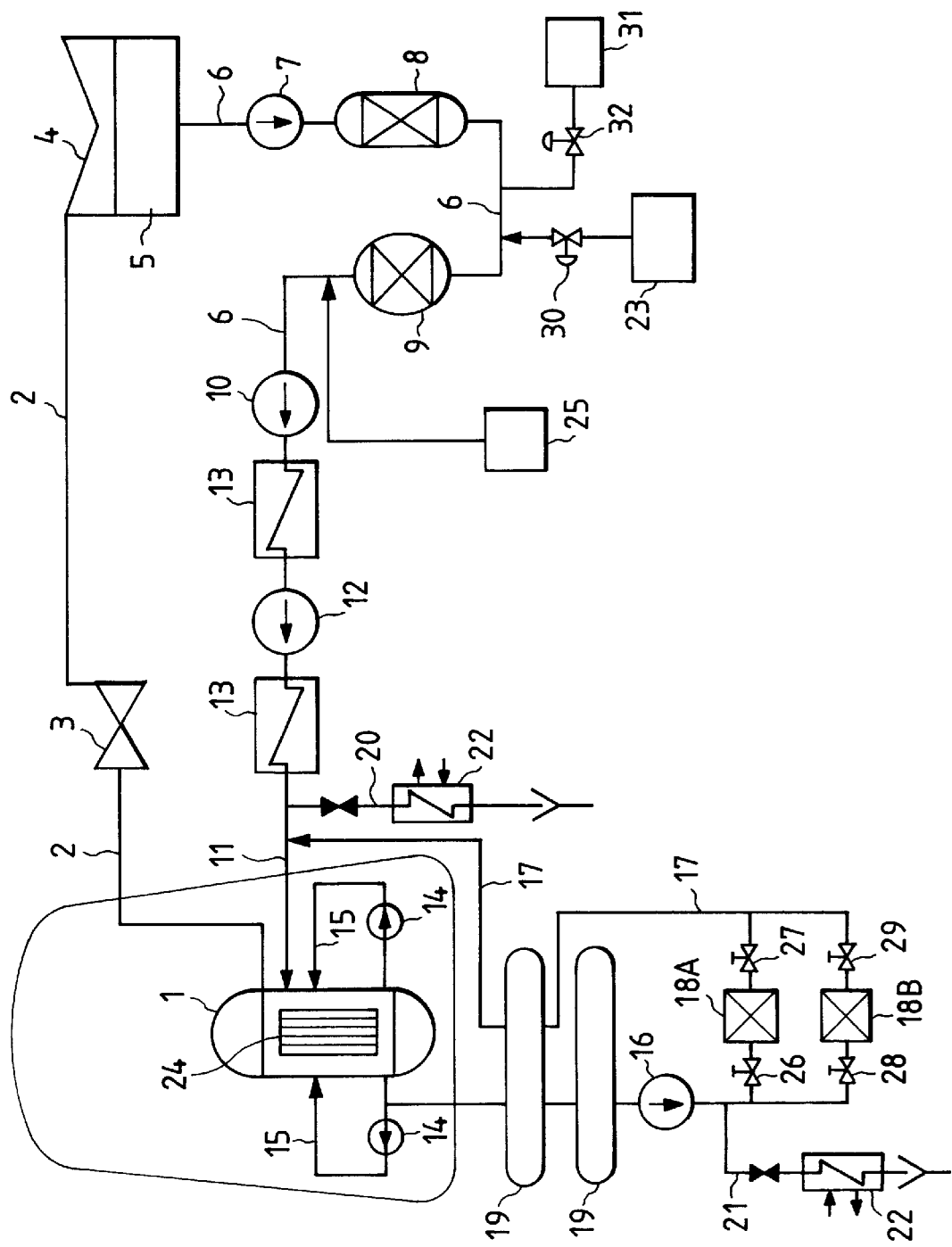
FIGS. 7 and 10 are schematic diagrams of BWR power plants according to other examples of this invention.

One of the proposed methods for shifting the pH of reactor water to the weak acid side is by injecting acidic substances, such as carbon dioxide gas, for example, into the feed water system or the condensate system. In this example, as seen in FIG. 7, carbon dioxide gas is injected into the feed water system or into the condensate system during the 2000 EFPH period, in addition to the operating method of the first example. That is, valve 32 is opened during the 2000 EFPH period, and the carbon dioxide gas is supplied into condensate piping 6 through valve 32 from carbon dioxide gas injection equipment 31. In the period between the 2000 EFPH period and the stopping of the BWR power plant, valve 32 is closed, and the supply of the carbon dioxide gas is stopped. FIG. 8A shows the carbon dioxide gas concentration in the feed water in this example.

Figure 8C:
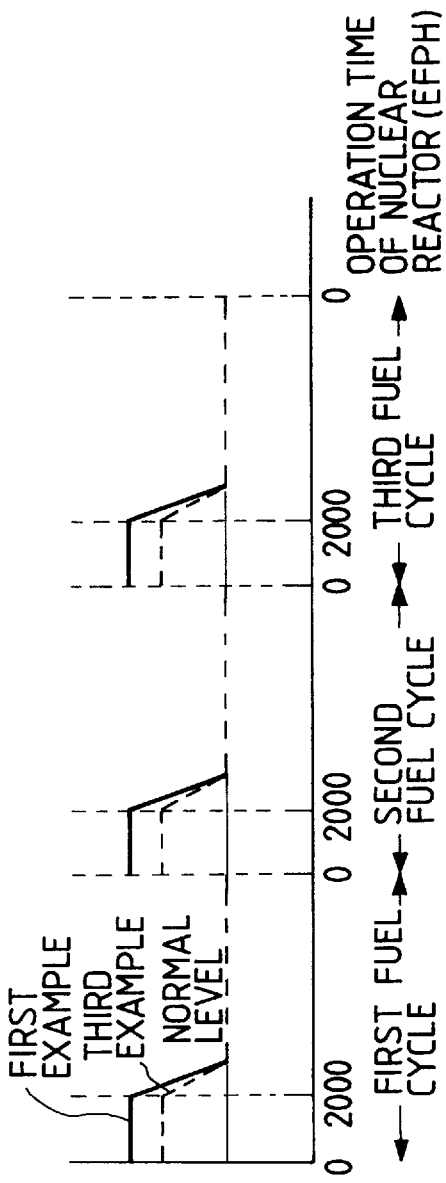
Figure 8D:
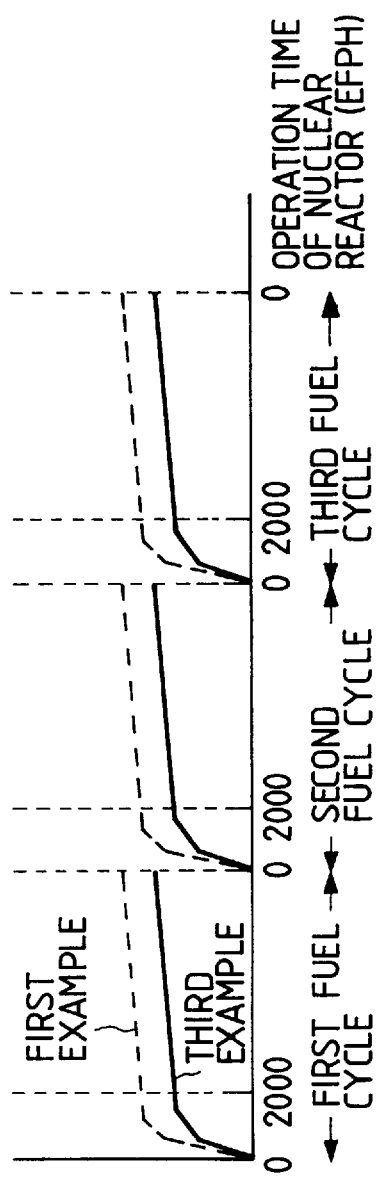
FIG. 8D is an operational diagram which shows a relation between a Cr content of an oxide film of a fuel rod that is newly loaded in a core and an operating time in each fuel cycle of the other examples of this invention.

Cr transforms from $CrO_4^{2-}$ to $Cr_2O_3$ by shifting the pH to the weak acid side, as explained with reference to FIG. 6. As a result, Cr becomes hard to dissolve into the feed water from the pipings of the feed water system and so on, so that the Cr concentration in the feed water decreases, as shown in FIG. 8B. Therefore, as is shown in FIG. 8C, the Cr concentration in the reactor water declines more than in the first example.

Figure 9:
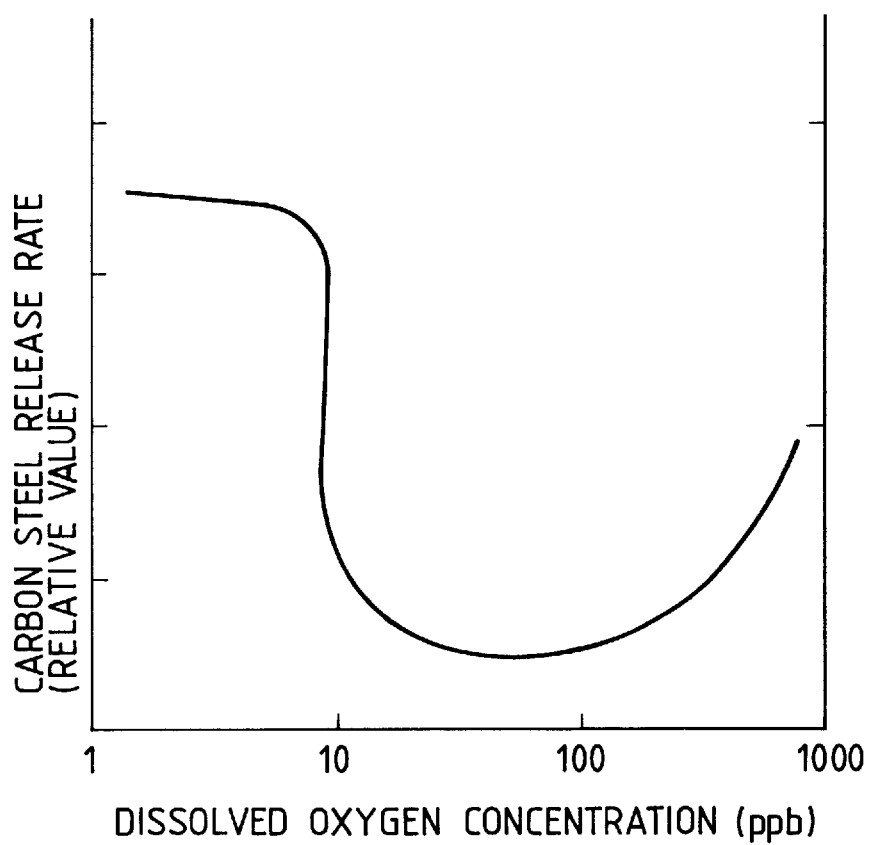
FIG. 9 is a characteristic diagram which shows a relation between a corrosion speed of carbon steel and a dissolved oxygen concentration.

As is shown in FIG. 8E, the third example can further reduce the Cr quantity taken in the oxide film of the fuel rod surfaces than in the first example. Therefore, the concentration of the radioactive substance in the reactor water becomes lower than in the first example. To effect transformation of Cr from $CrO_4^{2-}$ to $Cr_2O_3$, the corrosion potential can be reduced in other ways than by injecting acidic substances, such as carbon dioxide gas, into the feed water system or the condensate system. The reduction in the corrosion potential is shown in FIG. 6. The first method to realize a reduction of the corrosion potential is to minimize the quantity of oxygen injected from the condensate system. The inventors have gained the following knowledge by analyzing data obtained from the BWR power plant. That is, in a BWR power plant in which a high Cr concentration in the feed water is increased, the dissolved oxygen concentration in the feed water is controlled to a range of 40 ppb or more. The inventors also have gained the following knowledge by experiments. Namely, as is shown in FIG. 9, if the concentration of dissolved oxygen in the cooling water is controlled to 10 ppb or more, the corrosion of carbon steel is greatly reduced. Based on this knowledge, the quantity of oxygen injected into the feed water system or the condensate system was controlled so that the dissolved oxygen concentration in the feed water was adjusted to 10 to 30 ppb, preferably 10 to 20 ppb. This concentration of dissolved oxygen is adjusted by controlling the opening degree of valve 30 in FIG. 1, thereby to reduce the dissolution of the Cr from the structural material of the feed water system and/or the condensate system.

Figure 10:
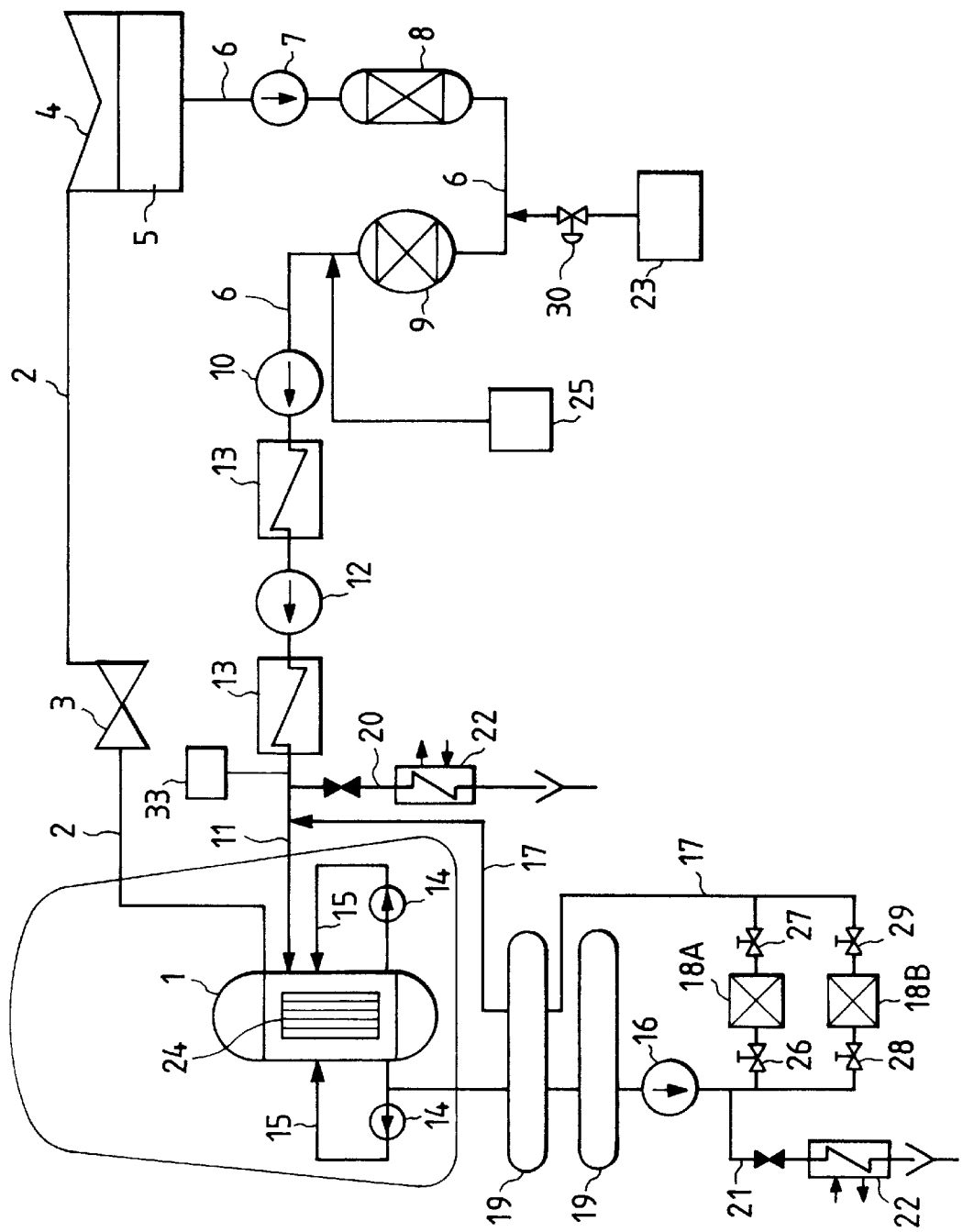

A second method for lowering the corrosion potential is to inject hydrogen gas into the feed water system. A desirable example of this second method is to inject hydrogen gas into the upper stream side of the feed water system upstream of the feed water heater. As is shown in FIG. 10, hydrogen gas is supplied into the feed water piping 11 from the hydrogen injection equipment 33 during the 2000 EFPH period, and then the supply of hydrogen gas is stopped during the period between 2000 EFPH and the stopping of the BWR power plant. This second method also stabilizes Cr as a Cr oxide on the surface of the structural material so that dissolution of Cr from the structural material of the feed water system is suppressed. A specific example of the method of injecting hydrogen gas is described in Japanese patent publication No. 63-19838. Another method for reducing Cr dissolution in the condensate system and the feed water system is to apply a material which is treated for reducing Cr dissolution to at least the tube of the feed water heaters in the systems. There are three methods of reducing Cr dissolution. A first method is to make the surface of the structural material in contact with the coolant as smooth as possible by electrolytic polishing, mechanical polishing and so on. The smoothness of the surface of the structural materials reduces the contact area with the coolant, so that the dissolution of Cr from the structural material is lowered. A second method is to plate noble metals, such as Pd and so forth, on the surface of the structural material in contact with the coolant by plating, lining or evaporation, for example. This coating film suppresses almost completely a dissolution of Cr from the structural material. A third method is to use a material from which Cr on the surface has been dissolved out in high-temperature reactor water or in high-temperature steam in an alkalized environment or in a high concentration of dissolved oxygen environment. The dissolution of Cr can also be reduced by this method. The quantity of dissolution of Cr from the primary system component into the primary system cooling water decreases by using the material which has been treated with the Cr reduction treatment. The Cr reduction treatment reduces the quantity of Cr that is supplied in the nuclear reactor. Therefore, the quantity of CR deposited on the fuel rods is reduced, and the concentration of the radioactive substance contained in the reactor water can be reduced.

What is claimed is:

1. A method of operating a BWR power plant that supplies reactor water to a core of a nuclear reactor loaded with a plurality of fuel assemblies comprising a plurality of fuel rods, comprising the steps of:

injecting an alkali metal or an alkaline earth metal into the reactor water during a term from a starting operation of a preoperating test or of each fuel cycle of said nuclear reactor to 2000 EFPH; and stopping the injection of said alkali metal or said alkaline earth metal during the period between 2000 EFPH and the stopping of said BWR power plant.

2. The method of operating a BWR power plant according to claim 1, which further comprises the steps of injecting oxygen into the reactor water during the term from said starting operation of said preoperating test or of each fuel cycle to 2000 EFPH; and stopping the injection of oxygen into the reactor water during the period between 2000 EFPH and the stopping of said BWR power plant.

3. The method of operating a BWR power plant according to claim 1, further comprising the steps of infecting a material for changing the pH of feed water to an acid side from one of a feed water system and a condensate system during the term from said starting operation of said preoperating test or of each fuel cycle to 2000 EFPH, and stopping said injection of said material for changing pH of feed water to the acid side during the period between 2000 EFPH and the stopping of said BWR power plant.

4. The method of operating a BWR power plant according to claim 3, wherein said material for changing the pH of said feed water to said acid side is an acidic substance or hydrogen gas.

5. The method of operating a BWR power plant according to claim 4, wherein hydrogen gas of 2 to 3 times a molar concentration of dissolved oxygen in said feed water is injected.

6. The method of operating a BWR power plant according to claim 3, wherein the quantity of oxygen injected from said condensate system or said feed water system is controlled so that the dissolved oxygen concentration in said feed water is 10~30 ppb in the term from said starting operation of said preoperating test or of each fuel cycle of said nuclear reactor to 2000 EFPH.

7. The method of operating a BWR power plant according to claim 1, wherein the surface of cladding tubes of said fuel rods for said fuel assemblies of 0(zero) GW·day/t burnup has no oxide film.

8. The method of operating a BWR power plant according to claim 1, wherein the quantity of reactor water supplied to a reactor water clean-up system during said term is larger than a quantity of reactor water supplied to said reactor water clean-up system for purifying reactor water during the period between 2000 EFPH and the stopping of said BWR power plant.

9. The method of operating a BWR power plant according to claim 1, wherein said BWR power plant includes a reactor water clean-up system comprising a clean-up system piping having both ends thereof connected to said nuclear reactor, a first clean-up equipment with ion exchange resin to which said alkali metal or said alkaline earth metal is added, said first clean-up equipment being installed in said clean-up system piping, and a second clean-up equipment connected in parallel with said first clean-up equipment having an ion exchange resin to which no said alkali metal or said alkaline earth metal is added, and wherein said step of injecting said alkali metal or said alkaline earth metal into the reactor water is effected by supplying the reactor water into said first clean-up equipment during the term from the starting operation of the preoperating test of said nuclear reactor or of each fuel cycle of said nuclear reactor to 2000 EFPH, and the step of stopping the injection is effected by supplying the reactor water to said second clean-up equipment during the period between 2000 EFPH and the stopping of said BWR power plant.

10. The method of operating a BWR power plant according to claim 1, wherein a primary system piping through which cooling water flows is connected to said nuclear reactor and uses low Cr dissolution material for at least part of said piping.

11. The method of operating a BWR power plant according to claim 10, wherein said low Cr corrosion material is a material from which Cr in the surface is dissolved one of advance in a high-temperature water, a high-temperature steam of an alkalized environment and a high dissolved oxygen environment.

12. The method of operating a BWR power plant according to claim 10, wherein the surface of said low Cr corrosion material is plated with a noble metal.

13. The method of operating a BWR power plant according to claim 10, wherein said low Cr dissolution material has a smooth surface formed by polishing.

14. A method of operating a BWR power plant comprising a nuclear reactor having a core loaded with a plurality of fuel assemblies each having a plurality of fuel rods and a reactor water clean-up system, wherein said reactor water clean-up system comprises:

a clean-up system piping, both ends of which are connected to said nuclear reactor;

a first clean-up equipment with ion exchange resin to which an alkali metal or an alkaline earth metal is added, said first clean-up equipment being installed in said clean-up system piping; and a second clean-up equipment connected in parallel with said first clean-up equipment having an ion exchange resin to which no said alkali metal or said alkaline earth metal is added; which method comprises the steps of:

supplying reactor water in said nuclear reactor to said clean-up system piping;

returning reactor water to said nuclear reactor after the reactor water is purified by said first clean-up equipment during a term from a starting test of a nuclear reactor and a starting operation of each fuel cycle to 2000 EFPH; and returning reactor water to said reactor after being purified by said second clean-up equipment during the period between 2000 EFPH and the stopping of the nuclear reactor.

15. A method of operating a BWR power plant wherein reactor water is supplied to a core of a nuclear reactor loaded with a plurality of fuel assemblies each comprising a plurality of fuel rods, comprising the steps of injecting oxygen into the reactor water in a term from a starting operation of a preoperating test or of each fuel cycle to 2000 EFPH, and stopping the injection of the oxygen to reactor water during the period between 2000 EFPH and the stopping of said BWR power plant.

16. A method of operating a BWR power plant wherein reactor water is supplied to a core of a nuclear reactor loaded with a plurality of fuel assemblies each comprising a plurality of fuel rods, comprising the steps of:

injecting at least one of (a) oxygen and (b) an alkali metal or an alkaline earth metal into the reactor water in a term from a starting operation of a preoperating test or of each fuel cycle to 2000 EFPH; and stopping the injection of the at least one of (a) oxygen and (b) an alkali metal or an alkaline earth metal to the reactor water during the period between 2000 EFPH and the stopping of said BWR power plant.

17. The method of operating a BWR power plant according to claim 16, wherein the step of injection includes injecting (b) an alkali metal or an alkaline earth metal, and the step of stopping the injection includes stopping the injection of (b) an alkali metal or an alkaline earth metal.

* * * * *